US006633881B2

(12) United States Patent
Drobish et al.

(10) Patent No.: US 6,633,881 B2
(45) Date of Patent: Oct. 14, 2003

(54) RECORD-KEEPING FOR GAMING MACHINE OPERATIONS

(75) Inventors: Robert Drobish, Bellingham, WA (US); William L. Boyd, Sedro-Woolley, WA (US)

(73) Assignee: The Upper Skagit Indian Tribe, Bow, WA (US)

( * ) Notice: Subject to any disclaimer, the term of this patent is extended or adjusted under 35 U.S.C. 154(b) by 0 days.

(21) Appl. No.: 09/935,788

(22) Filed: Aug. 22, 2001

(65) Prior Publication Data

US 2003/0041067 A1 Feb. 27, 2003

(51) Int. Cl.[7] .................................... G06F 7/00
(52) U.S. Cl. .................................... 707/100; 707/10
(58) Field of Search .................... 707/1–4, 10, 100; 709/200–203; 235/375, 379–385, 435, 434, 454, 462.01; 382/312, 313

(56) References Cited

U.S. PATENT DOCUMENTS

| | | | | | |
|---|---|---|---|---|---|
| 3,575,586 | A | * | 4/1971 | Kroll | 235/378 |
| 4,907,250 | A | | 3/1990 | Ricks | |
| 5,233,343 | A | * | 8/1993 | Mazzoni | 221/154 |
| 5,321,242 | A | | 6/1994 | Heath, Jr. | |
| 5,434,394 | A | * | 7/1995 | Roach et al. | 235/375 |
| 5,450,385 | A | * | 9/1995 | Ellis et al. | 235/385 |
| 5,451,757 | A | * | 9/1995 | Heath, Jr. | 235/375 |
| 5,507,378 | A | | 4/1996 | Leone | |
| 5,568,855 | A | * | 10/1996 | Hoffman et al. | 194/203 |
| 5,735,034 | A | | 4/1998 | Citron et al. | |
| 5,907,141 | A | | 5/1999 | Deaville et al. | |
| 5,945,660 | A | | 8/1999 | Nakasuji et al. | |
| 5,959,275 | A | | 9/1999 | Hughes et al. | |
| 6,022,687 | A | * | 2/2000 | Letarte et al. | 435/6 |
| 6,328,149 | B1 | * | 12/2001 | Blad et al. | 194/217 |
| 6,361,437 | B1 | * | 3/2002 | Walker et al. | 463/23 |
| 6,393,462 | B1 | * | 5/2002 | Mullen-Schultz | 707/201 |

OTHER PUBLICATIONS

VendingData Corporation, n.d., <www.vendingdata.com> [retrieved Nov. 21, 2001].

* cited by examiner

*Primary Examiner*—Greta Robinson
*Assistant Examiner*—Harold E. Dodds, Jr.
(74) *Attorney, Agent, or Firm*—Christensen O'Connor Johnson Kindness PLLC

(57) ABSTRACT

A system and method for providing record-keeping in a gaming environment where money or scripts representing money are collected from a gaming area on a routine basis. Using a scanning device, information tags affixed to gaming machines and removable money boxes attached to the gaming machines are scanned for information regarding the identification of the gaming machines and money boxes. Data is transmitted to a database to be recorded and later assessed using a record-keeping program. Once all money boxes have been collected in a gaming area, the data can be assessed for anomalies by using a record-keeping program running on the server computer.

26 Claims, 7 Drawing Sheets

RECORD-KEEPING FOR GAMING MACHINE OPERATIONS

FIELD OF THE INVENTION

The present invention relates generally to record-keeping in a gaming environment and more specifically to a record-keeping system and method using a computer-based infrastructure and information tag scanning devices.

BACKGROUND OF THE INVENTION

Maintaining gaming machines in a gaming environment, such as that of a busy casino floor, is a very labor intensive undertaking. In particular, when money, or scripts in a cashless system, must be collected from the gaming area, specific problems with respect to accountability arise. These specific problems include missing money boxes, missed gaming machines, misallocated money and lost or stolen money. An individual will typically travel through the gaming area at regular intervals in order to retrieve money collected at each gaming machine. Casinos must mark or identify each gaming machine, as well as each removable money box associated with each gaming machine in some fashion that allows an accounting department to associate collected money to a particular gaming machine. The process of marking or identifying a removable money box at the gaming machine is usually done manually with paper, tags, tape, etc. Obviously, with the amount of human interaction involved with the identification and collection of removable money boxes, missing identifications, unreadable identifications, or misidentifications are prevalent. This leads to inaccurate accounting of money from gaming operations.

An additional problem with gaming machines having removable money boxes that are collected in this manner is the large amount of man-hours required to mark the removable money boxes and the accounting time necessary to ascertain the proper location of unidentifiable removable money boxes. The inventoried assets are numerous and fluidly move throughout the gaming area to meet the needs of a busy gaming operation. The various movements of the removable money boxes, their timing, and the volume of assets makes tracking the money boxes an extremely laborious undertaking that can lead to missing information, missed numbers, miscoding into accounting systems, and even completely missed gaming areas. Computers have been used in the past to help facilitate the assimilation of information from collected money, however, human input of the information was still necessary, and thus, errors were still prevalent. The amount of time required to manually input all necessary information into a computer was also very extensive.

SUMMARY OF THE INVENTION

The present invention is directed to a system and method for providing record-keeping in a gaming environment where money or scripts representing money are collected from a gaming area on a routine basis. Using a scanning device, information tags affixed to gaming machines and removable money boxes attached to the gaming machines are scanned for information regarding the identification of the gaming machines and money boxes. Once the information tags are scanned and a particular money box is associated with a particular gaming machine, this information is transmitted to a server computer to be stored in a database for later use with money counting and error assessment.

Once all money boxes have been collected in a gaming area, the data can be assessed for anomalies by using a record-keeping program running on the server computer. Anomalies can be identified as missed gaming machines or missing money boxes in a given time frame.

In one embodiment of the present invention, the scanning device is used to identify full money boxes in a counting room during a counting procedure just prior to the counting of the money collected inside. Once the money has been counted, data representing the total amount of money, as well as the identification of the money box, is transmitted to the database in the server computer and associated with the particular gaming machine from which the money box originally came. This allows a user to assess more data for anomalies such as historical trends, poorly performing gaming machines, and lost money boxes after collection.

In another embodiment of the present invention, the information collected by the scanning device is transmitted to the database via an RF communication link between the scanning device and a computer connected to a computer network capable of communicating with the server computer. Alternatively, after all information has been gathered from a particular gaming area, the data collected by the scanning device is downloaded via a receiving base that is connected to a computer network capable of communicating with the server computer.

In yet another embodiment, the present invention employs a record-keeping program to assess the data collected in order to determine a number of anomalies. Anomalies include missing money boxes, missed gaming machines, arrangement of gaming machines, historical trends of gaming machines, historical trends of money box collection, maintenance of gaming machines and gaming areas, miscounted money boxes, and graphical timing trends.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a system and method for providing record-keeping in a gaming environment where money or scripts representing money are collected from a gaming area on a routine basis. Record-keeping is a general term that refers to any situation where records are kept regarding the collection of information. In one embodiment of the present invention, information collected from money boxes and gaming machines is recorded on a computer database. This information can then be used for a number of different purposes; for example, identifying money boxes yet to be collected. A gaming environment is typically a casino floor that has many gaming machines in a concentrated area, although any area which has a gaming machine can be a gaming environment. A gaming machine is defined as any machine or apparatus that is capable of storing money or scripts in a money box which was spent to use the gaming machine. Examples of gaming machines are slot machines, craps tables, etc. Gaming areas with a high concentration of gaming machines prove to be difficult environments in regard to quickly and accurately retrieving money or scripts from each money box. By using a scanning device, information tags, and an accounting program running on a suitable computer in accordance with the present invention, the speed and accuracy of money box retrieval is greatly enhanced.

Figure 1:
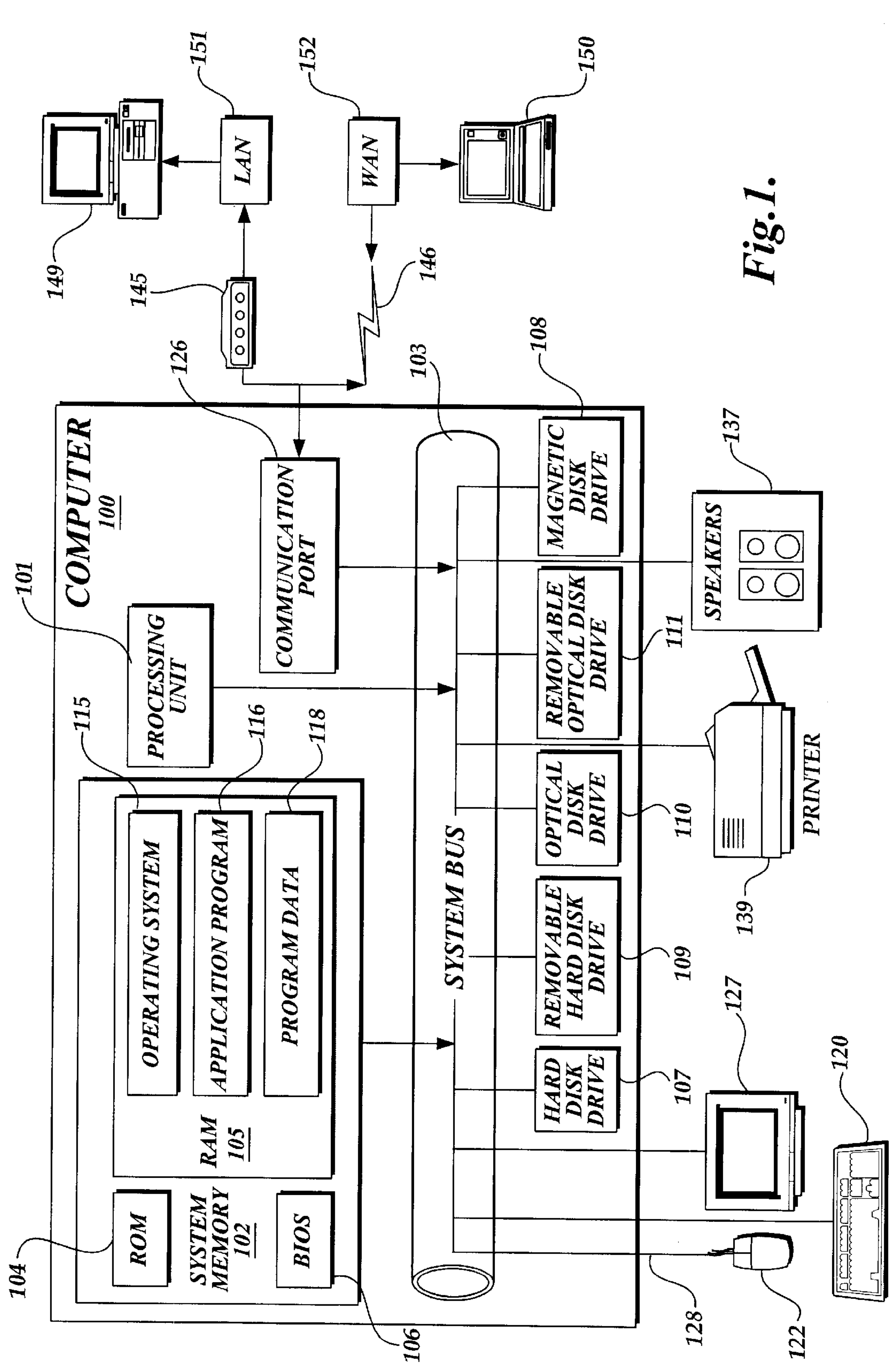
FIG. 1 depicts an exemplary personal computing environment suitable for executing embodiments of the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 100, including a processing unit 101, a system memory 102, and a system bus 103 that couples various system components including the system memory to the processing unit 101. The system bus 103 may be any of several types of bus structures including a memory bus or memory controller, a peripheral bus, and a local bus using any of a variety of bus architectures. The system memory includes read only memory (ROM) 104 and random access memory (RAM) 105. A basic input/output system (BIOS) 106, containing the basic routines that help to transfer information between elements within the personal computer 100, such as during start-up, is stored in ROM 104. The personal computer 100 further includes a hard disk drive 107 for reading from and writing to a hard disk, not shown, a magnetic disk drive 108 for reading from or writing to a removable magnetic disk 109, and an optical disk drive 110 for reading from or writing to a removable optical disk 111 such as a CD-ROM or other optical media. The hard disk drive 107, magnetic disk drive 108, and optical disk drive 110 are connected to the system bus 103 by a hard disk drive interface, a magnetic disk drive interface, and an optical drive interface, respectively. The drives and their associated computer-readable media provide nonvolatile storage of computer readable instructions, data structures, program modules and other data for the personal computer 100. Although the exemplary environment described herein employs a hard disk, a removable magnetic disk 109 and a removable optical disk 111, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 109, optical disk 111, ROM 104 or RAM 105, including an operating system 115, one or more application programs 116, and program data 118. A user may enter commands and information into the personal computer 100 through input devices such as a keyboard 120 and pointing device 122. Other input devices (not shown) may include a microphone, joystick, game pad, satellite dish, scanner, or the like. These and other input devices are often connected to the processing unit 101 through a serial port interface 126 that is coupled to the system bus, but may be connected by other interfaces, such as a parallel port, game port, a universal serial bus (USB), or firewire. A monitor 127 or other type of display device is also connected to the system bus 103 via an interface, such as a video adapter 128. One or more speakers 137 are also connected to the system bus 103 via an interface, such as an audio adapter 136. In addition to the monitor and speakers, personal computers typically include other peripheral output devices (not shown), such as printers.

The personal computer 100 operates in a networked environment using logical connections to one or more remote computers, such as remote computers 149 and 150. Each remote computer 149 or 150 may be another personal computer, a server, a router, a network PC, a peer device or other common network node, and typically includes many or all of the elements described above relative to the personal computer 100. The logical connections depicted in FIG. 1 include a local area network (LAN) 151 and a wide area network (WAN) 152. Such networking environments are commonplace in offices, enterprise-wide computer networks, intranets and the Internet. As depicted in FIG. 1, the remote computer 150 communicates with the personal computer 100 via the local area network 151. The remote computer 149 communicates with the personal computer 100 via the wide area network 152.

When used in a LAN networking environment, the personal computer 100 is connected to the local network 151 through a network interface or adapter 153. When used in a WAN networking environment, the personal computer 100 typically includes a modem 154 or other means for establishing communications over the wide area network 152, such as the Internet. The modem 154, which may be internal or external, is connected to the system bus 103 via the serial port interface 136. In a networked environment, program modules depicted relative to the personal computer 100, or portions thereof, may be stored in the remote memory storage device. It will be appreciated that the network connections shown are exemplary and other means of establishing a communications link between the computers may be used.

Figure 2:
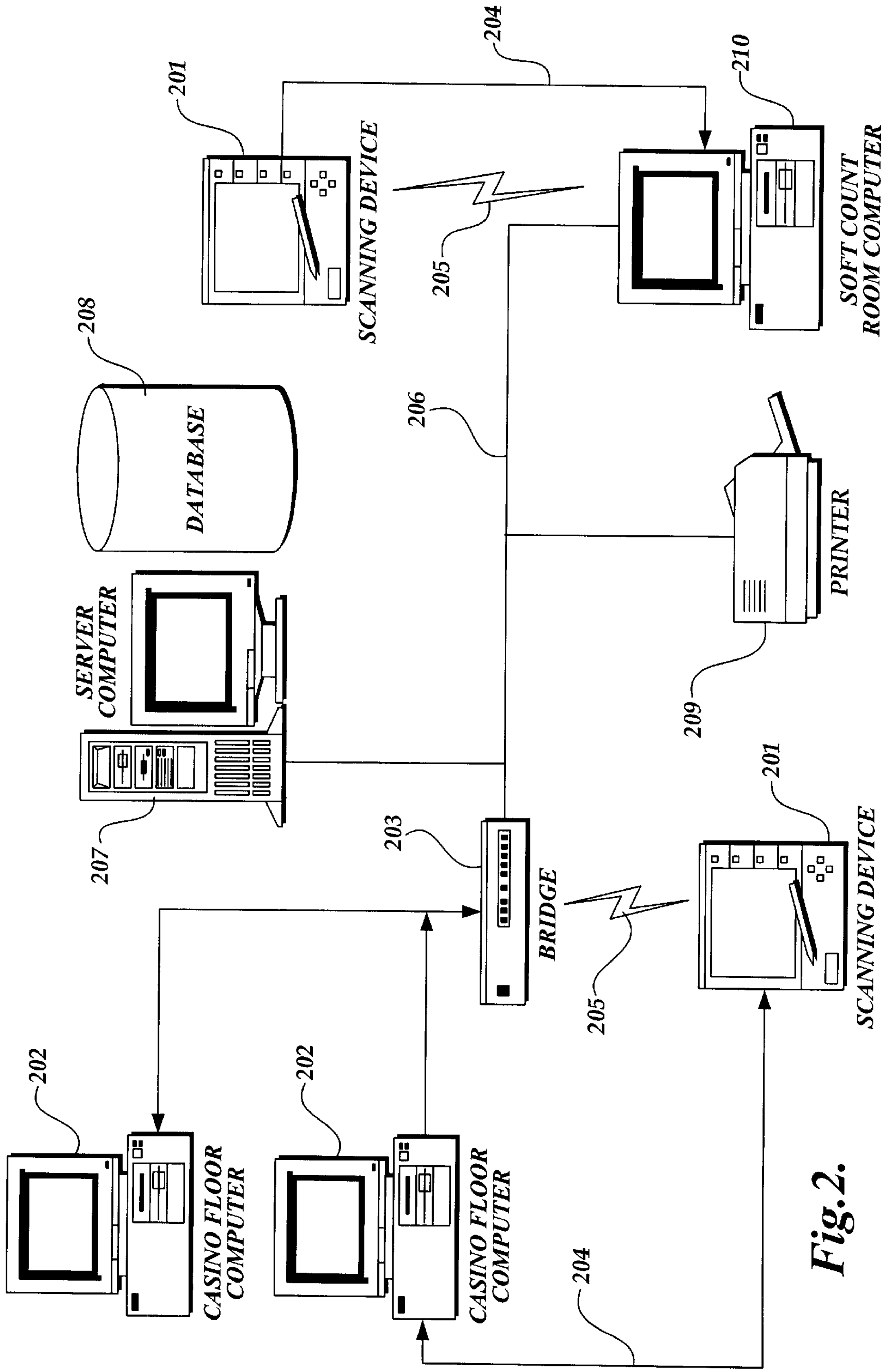
FIG. 2 depicts an exemplary computer networking environment suitable for executing embodiments of the present invention.

FIG. 2 illustrates an exemplary architecture of a networked system in which the present invention operates. The computer network 206 may be a local area network 151, a wide area network 152, or a combination of networks that allow a server computer 207 to communicate with remote computers, such as the remote computers 202 or to a scanning device 201. As is often the case, a bridge 203 or hub may be used to help facilitate network traffic. The server computer 207 and the remote computers 202 are preferably similar to the personal computer 100 depicted in FIG. 1 and discussed above. Additional computers may be connected to the computer network 206, such as a counting room computer 210 as well as other additional devices, such as a printer 209. The scanning devices are capable of communicating with the computer network 206 via a hard-wired connection 204, sometimes referred to as a non-RF connection 204, or a wireless connection 205, sometimes referred to as an RF connection 205. RF and non-RF communication devices and standards are well known in the industry and are not discussed further herein.

In this particular computer network, the record-keeping system and method of the present invention may be implemented. Information can be retrieved using a scanning device 201 that reads information from information tags anywhere in the gaming environment. An information tag is a means of representing information in a format capable of digital transmission. Examples of an information tag include bar codes, magnetic strips, radio tags, optical markings, etc. A scanning device is any device capable of interpreting information that is encoded on the information tags. Examples include bar-code scanners, magnetic strip readers, RF scanners, optical readers, etc. Scanning devices capable of retrieving information from an information tag are well known in the industry and are not discussed further herein. In one embodiment, the scanning device 201 uses an RF connection 205, such that information retrieved from an information tag is immediately transmitted to a server computer 207 and stored in a database 208 that resides in the memory of the server computer. In another embodiment, if the scanning device 201 does not have an RF connection 205, then the information retrieved from the information tag is stored internally in the scanning device until a download process can be conducted. The download process is described in greater detail below and is depicted graphically in FIG. 6. A download process can be implemented when a non-RF connection 204 is established with a remote computer 202 or any computer capable of communicating with the server computer 207 via the computer network 206. Information retrieved from information tags may also be manually entered using a remote computer 202 or any other computer capable of communicating with the server computer 207 via the computer network 206. It will be appreciated that other mechanisms for communicating between the scanning device 201 and the server computer 207 are available, such as microwave transmissions, however these mechanisms need not be described herein as these mechanisms are well known in the industry.

Figure 3:
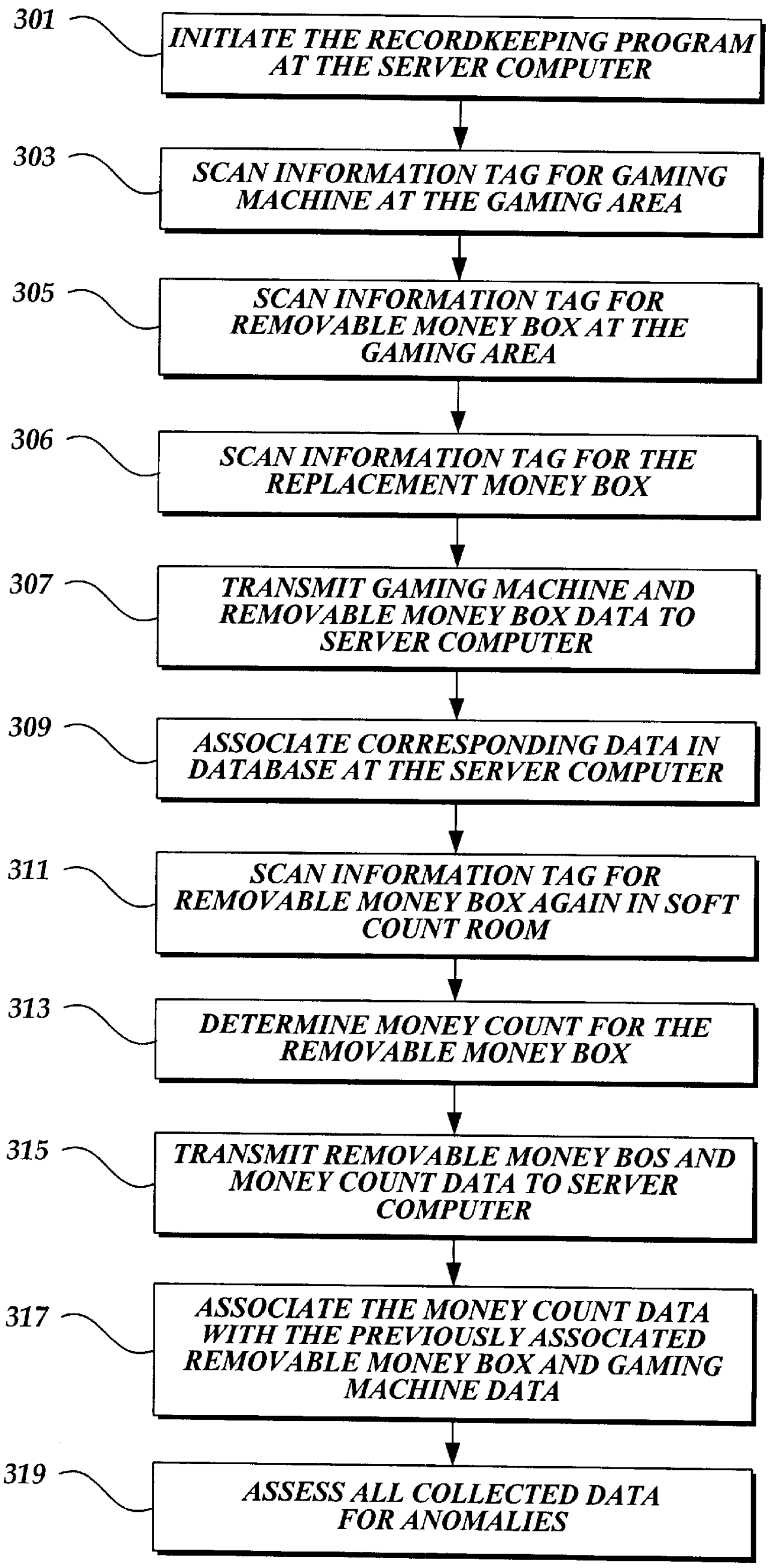
FIG. 3 is a flow chart of a method for record-keeping using information tags in a gaming environment in accordance with one embodiment of the present invention.

FIG. 3 is a flowchart of a method for record-keeping in a gaming machine environment using information tags. At step 301, a record-keeping program is initiated on a server computer 207 (FIG. 2). Aspects of the record-keeping program will be discussed in greater detail below. Contained within the record-keeping program is a pre-defined set of parameters that correspond with the particular gaming environment that is sought to be used in conjunction with the present invention. This set of parameters includes information regarding the number and types of gaming machines, a unique identification of each machine which is also embodied in an information tag affixed to each gaming machine, the number of removable money boxes used in the gaming environment, a unique identification of each money box which is also embodied in an information tag affixed to each money box. Additional information can be stored in the set of parameters as well, such as a history of money collected at each gaming machine, past recorded anomalies, frequency and times of each data entry, etc. Once the record-keeping program has been initiated, information can be retrieved and stored in the database 208 on the server computer 207.

The system is now ready to retrieve all the information necessary from a gaming machine environment. In one embodiment of the method, a user of a scanning device will travel to the gaming machine environment and begin collecting the full money boxes that are attached to each gaming machine. Upon encountering the first gaming machine in step 303, the information tag affixed to the gaming machine is scanned using the scanning device 201 and information is retrieved and recorded that uniquely identifies the gaming machine. Then, in step 305, typically the money box attached to that particular gaming machine is removed and scanned to retrieve information that uniquely identifies the removable money box. Typically, the individual collecting the full money boxes will then replace the removed money box which is full of money or scripts with an empty money box which is then scanned as well. This process is then repeated for each gaming machine in the gaming environment.

At step 307, the information retrieved and recorded by the scanning device 201 is transmitted to the server computer 207 that is running the record-keeping program. This may be done using an RF connection or a non-RF connection as was detailed previously. If an RF connection is being used, the information can be transmitted to the server computer 207 as it is being retrieved, which alleviates the need to record the information at the scanning device and then later transmit the information in step 307. At step 309, the information transmitted to the database is then associated in accordance with the the order of information collection. Each gaming machine is associated in the databse with a money box that was removed as well as a money box that replaced the removed money box. This information is used later to determine whether or not an anomaly has occurred.

In one embodiment, an assessment of any anomalies in the data collected may be performed in step 319. Since the set of parameters originally in the record-keeping program can be used as a benchmark against the information collected, it can easily be determined if a particular gaming machine was not identified in the collection of information. Therefore, an anomaly can be determined. Alternatively, an anomaly may be a missed gaming table, a missed money box, a gaming table identified twice, a money box identified twice, or any other error that may occur in the collection of money boxes, such as failure to follow regulatory compliance with set standards.

In another embodiment, once all money boxes have been collected and transported to a central area, such as that of a soft count or hard count room, the record-keeping program can be employed to find additional anomalies that may result after the counting of the money retrieved from the money boxes is accomplished. In step 311, a money box is scanned again using a scanning device to identify the money box. In step 313, the amount of money contained in the box is counted and manually entered using a counting room computer 210 that is connected to the computer network 206. Alternatively, script located in the money box may also contain a barcode that can be scanned to identify the amount of money residing in a particular money box. Once this information has been retrieved, it is transmitted, in step 315, to the database at the server computer 207. As was the case previously, the information may be simultaneously transmitted as it is retrieved from the barcodes, thus eliminating the need to perform a download process later. At step 317, the information transmitted to the database is then associated with the respective gaming machine/money box tandem from which it was retrieved. Each gaming machine identified is associated with the particular money box retrieved from it as well as the amount of money collected from the particular money box. This information is used later to determine whether or not an anomaly has occurred. In step 319, all information recorded is then used to identify anomalies of a nature described previously.

Figure 4:
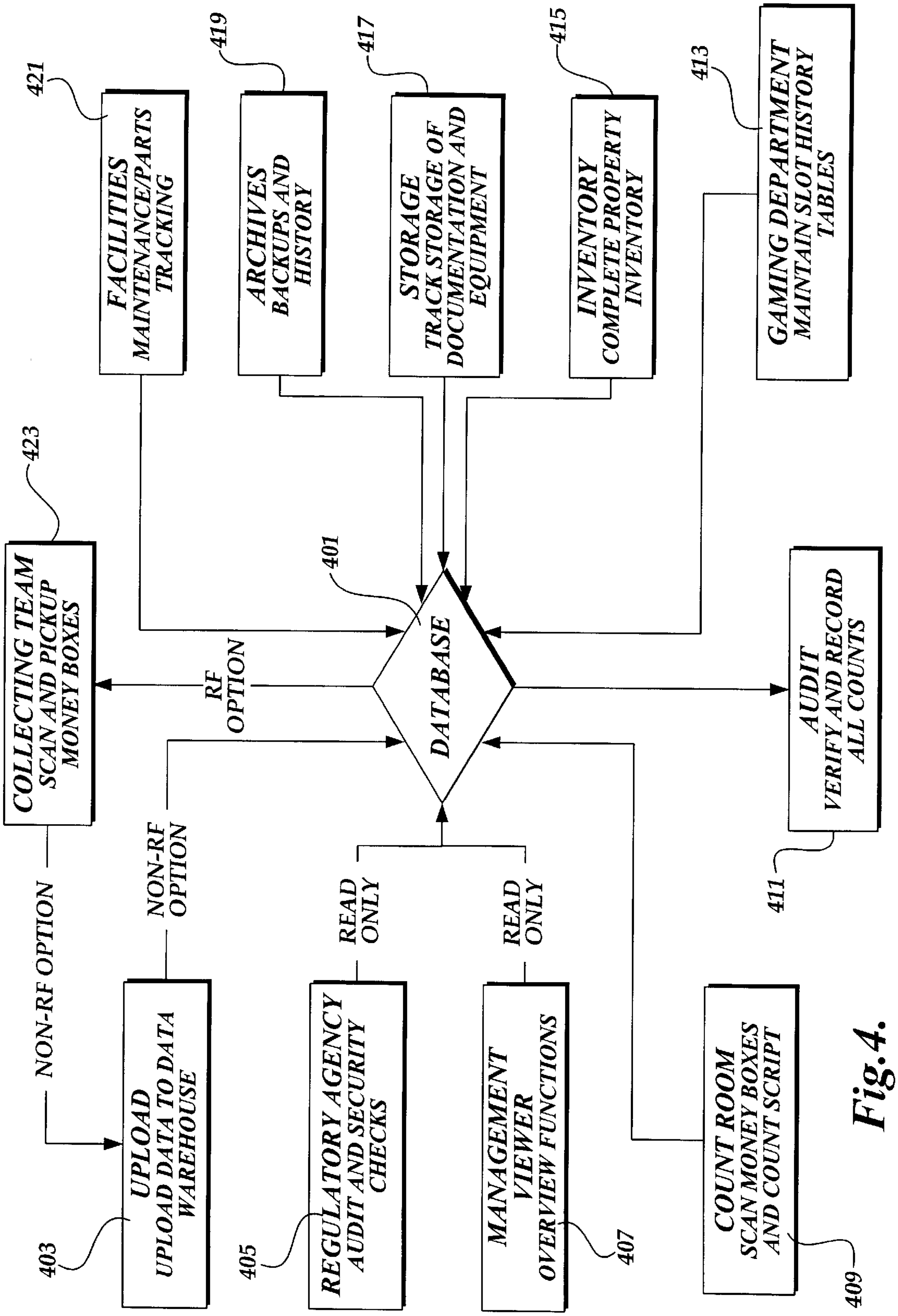
FIG. 4 is an organizational overview chart of a computer program for record-keeping in a gaming environment.

FIG. 4 is a graphical representation of the program components of the record-keeping system. As was previously pointed out, the record-keeping system is a series of programs residing on a server computer connected to a computer network that is capable of gathering information from remote locations, such as computers on a casino floor or a scanning device via a communication connection. Information gathered is stored in a database 401 that serves as the central data server for all other subroutines within the record-keeping program. Two subroutines are present to allow information to be transmitted from a gathering point to the database. A collection team subroutine 423 allows scanning devices or remote computers to transmit information to the database 401 using an RF connection. In similar fashion, an upload subroutine 403 allows scanning devices or remote computers to transmit information to the database 401 using a non-RF connection. Alternatively, when an RF connection is not present, the collection team subroutine 423 can transmit information to the database 401 via a non-RF connection using the upload subroutine 403.

An additional nine subroutines allow a user to manipulate information and identify particular anomalies that occur during operation. First, a count team subroutine 409 controls the process of identifying information received during the counting process from a remote location and associating the information appropriately in the database. For example, information from a scan is received identifying a particular money box and the money associated with it. This subroutine records the time that the information was received, and then also associates independently the particular gaming table, the associated money box, the gaming area of the gaming machine, as well as any other information typically associated with the collection of money, i.e., manager on duty, date of collection, collection number, etc. In conjunction with this subroutine, an audit subroutine 411 is employed to facilitate the auditing of money retrieved from the money boxes. As was the case with the count team subroutine 409, the audit subroutine 411 also provides a process of identifying information received from a remote location and associating the information appropriately in the database. In one embodiment, the remote location is the gaming floor and the audit subroutine is invoked when gaming machine meter readings are inputted manually then compared against the database. The same kind of information detailed previously is stored in the database.

The remaining seven subroutines assist a user with identifying anomalies and tracking the information recorded. A gaming department subroutine 413 allows a user to track the history of particular gaming machines. An inventory subroutine 415 allows a user to quickly identify the number and type of equipment on a gaming property. A storage subroutine 417 allows a user to track stored media, as well as gaming machines and money boxes in separate storage, or generally not in gaming use. An archives subroutine 419 allows a user to maintain a recorded history of all information gathered. Next, a facilities subroutine 421 allows a user to track maintenance, part replacement, and part availability in a gaming machine environment. Two final subroutines allow a user to view information stored in the database in a read-only fashion. A regulatory agency subroutine 405 allows a user to perform an audit of the information stored as well as perform a security check. A management viewer subroutine 407 is an overview program that allows a user to peruse through many functions of the record-keeping system for areas to include, but not limited to, machine utilization, anomalies with the collection team, soft count, hard count, inventory maintenance and machine problems.

Figure 5A:
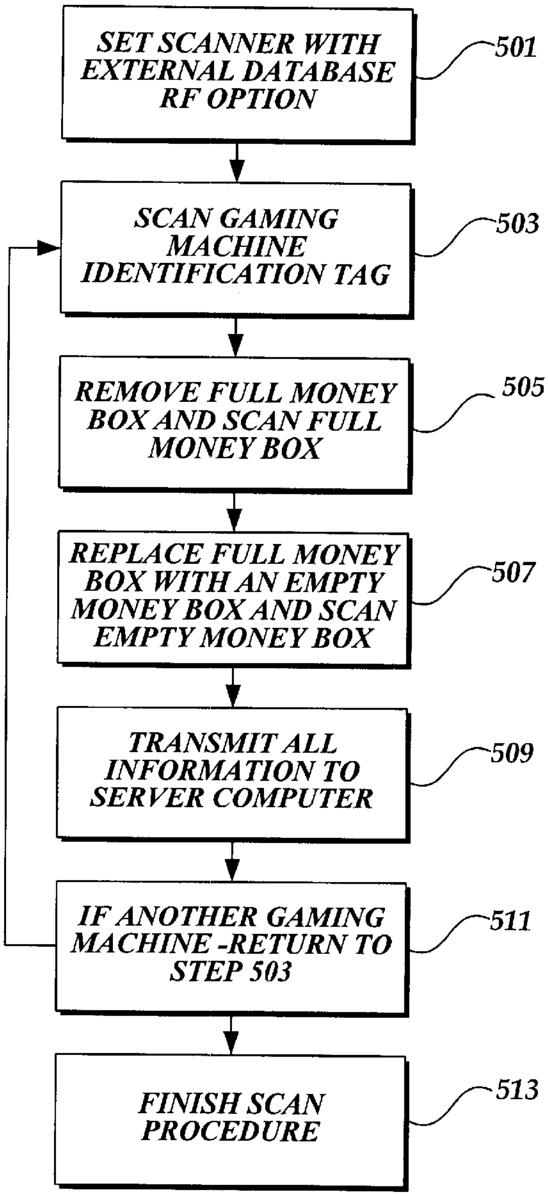
FIG. 5 is a flowchart illustrating the operation of a RF option and a non-RF option for transmitting data retrieved by using a scanning device from gaming machines and money boxes for record-keeping.
Figure 5B:
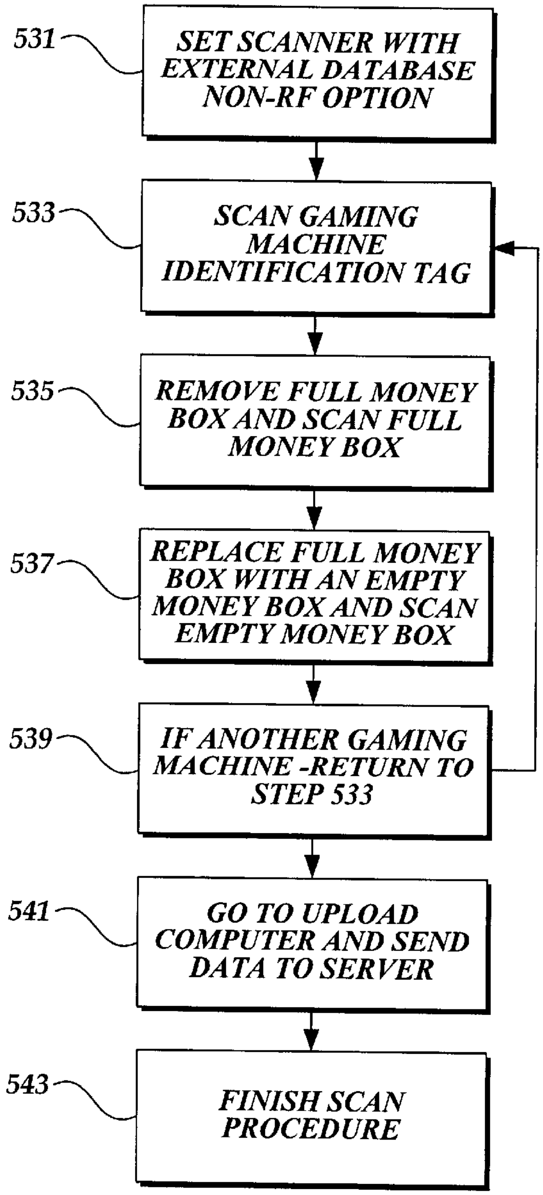

FIG. 5 depicts a flowchart of a collect money boxes process for scanning an information tag using a scanning device for both an RF option and a non-RF option. An operator of the system begins the data collection procedure by setting the scanning device to collect money boxes mode with an RF communication function in step 501. Once an RF communication link is established with the computer network and the main server computer, the operator begins the process of collecting money boxes from a gaming area in step 503 by locating a gaming machine that has yet to be scanned during this pass through. Once an unscanned gaming machine is located, the operator then scans the information tag affixed to the gaming machine. Recognizing the information tag as that of one affixed to a gaming machine, the scanning device then, in step 505 awaits a scan of an information tag associated with a money box. If another gaming machine is scanned prior to a money box, an error results and the scanning device is manually reset, and awaits an un-scanned money box. Recognizing the information tag s that of a particular money box, the scanning device then awaits a scan of another money box that is different from the one just scanned. The second money box scanned is the replacement money box that is attached to the gaming machine from which the first money box was just removed. If another gaming machine or the same money box is scanned prior to the second money box, an error results and the scanning device is manually reset and awaits another un-scanned money box. In step 507, the operator then scans a different empty money box and attaches it to the same particular gaming machine. In step 509, once all three steps are completed in this particular order, the information is then transmitted via the RF communication link to the server computer for storage in the database. The operator makes a decision in step 511 as to whether or not all gaming machines have been scanned in the gaming area during this pass through. Alternatively, an indication is transmitted back to the scanning device by the server computer, when all gaming machines have been scanned in a particular area. If another gaming machine remains, the process reverts back to step 503 and repeats as often as necessary. If no gaming machines remain, then the process is complete in step 513.

In a very similar fashion, a non-RF communication scanning process can also be invoked. An operator of the system begins the data collection procedure by setting the scanning device to collect money boxes mode with a non-RF communication function in step 531. The operator begins the process of collecting money boxes from a gaming area in step 533 by locating a gaming machine that has yet to be scanned during this pass through. Once an unscanned gaming machine is located, the operator then scans the information tag affixed to the gaming machine. Recognizing the information tag as that of one affixed to a particular gaming machine, the scanning device then awaits a scan of an information tag associated with a money box. If another gaming machine is scanned prior to a money box, an error results and the scanning device is manually reset and awaits another un-scanned money box. In step 535, the operator then scans the information tag affixed to the money box that was just removed from the gaming machine. Recognizing the information tag as that of one affixed to a particular money box, the scanning device then awaits a scan of another money box that is different from the one just scanned. If another gaming machine or the same money box is scanned prior to the second money box, an error results and the scanning device is manually reset and awaits another un-scanned money box. In step 537, the operator then scans a different empty money box and attaches it to the same particular gaming machine. In step 539, once all three steps are completed, the information is then recorded in internal memory of the scanning device for later transmission via a communication link between a remote computer and the server computer for storage in the database. The operator makes a decision in step 539 as to whether or not all gaming machines have been scanned in the gaming area during this pass through. If another gaming machine remains, the process reverts back to step 533 and repeats as often as necessary. In no gaming machines remain, then the operator, in step 541 locates a remote computer that has an established communication link to the server computer and a scanning device download procedure is initiated. The scanning device procedure is explained in greater detail below. Once the scanning device download procedure process is complete, the collect money boxes process comes to an end in step 543.

Figure 6:
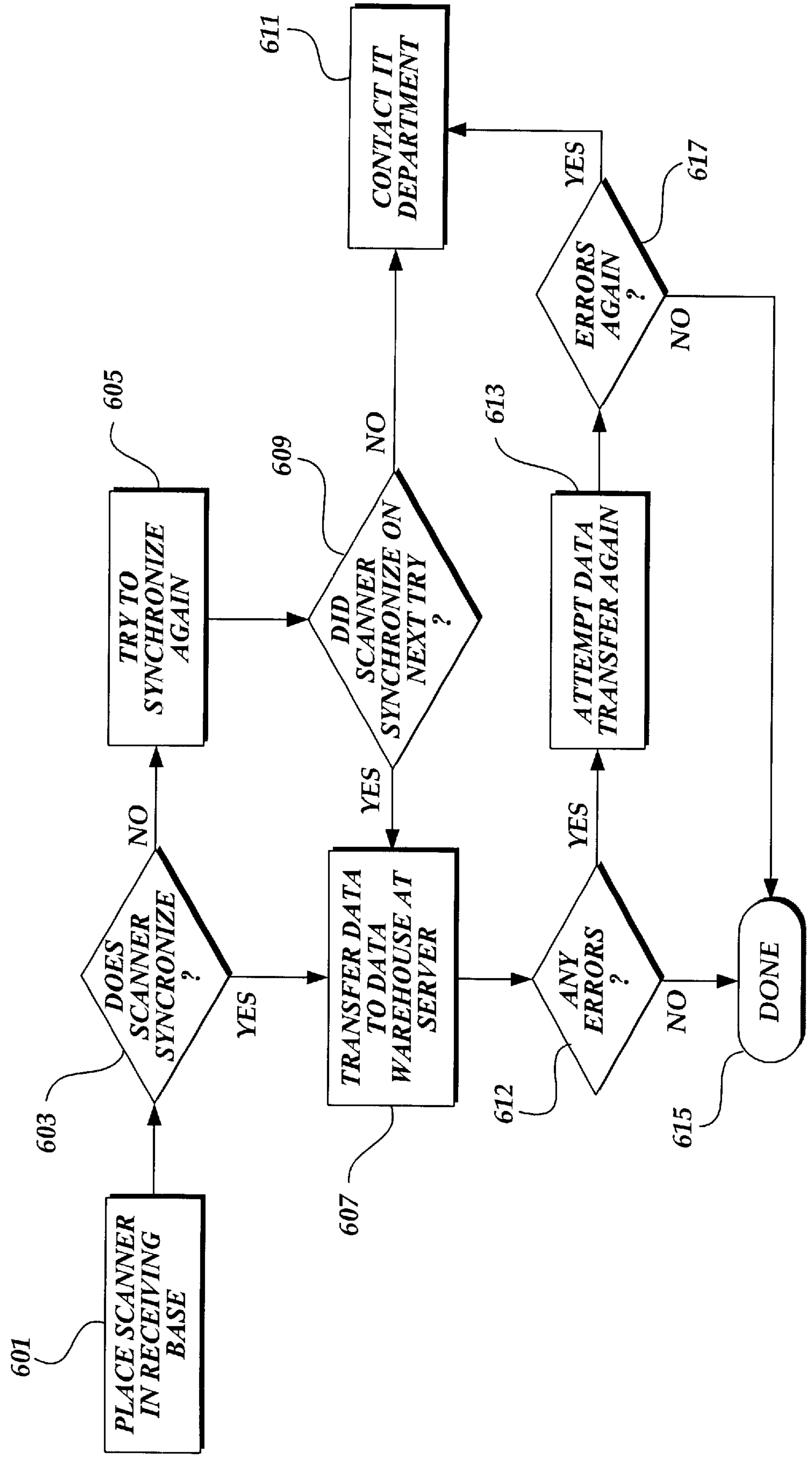
FIG. 6 is a flowchart of the operation of a scanning device download procedure between a scanning device and a server computer for a non-RF option of retrieving information from money boxes and gaming machines.

FIG. 6 depicts a flowchart of the scanning device download procedure. In a situation where an RF communication link between the scanning device and the server computer is not available, data stored in a scanning device during money box collection must be downloaded to the server computer in order to be used by the record-keeping program. An operator begins the process, typically, by establishing a communication link to a remote computer in step 601. When a proper link is established, a synchronization program is automatically started to determine if a proper download link can be established in step 603. If a proper download link is established, then the data collected is downloaded in step 607, from the memory of the scanning device to the database at the server computer. If a proper download link cannot be established, then the synchronization program tries to establish a link a second time in step 605. If a proper download link is established this time, then the data collected is downloaded, in step 607, from the memory of the scanning device to the database at the server computer. If a link still cannot be established, then a communication error exists and the scanning device download procedure ends unsuccessfully in step 611. Once data has been downloaded, an error checking program is automatically invoked to check the validity of the data in step 612. An example of invalid data would be records having an incorrect date, data format, or any other form of data inconsistent with data transfer standards. If errors are not present in the data, then the scanning device download procedure ends successfully in step 615. If errors are present, then in step 613, typically the user attempts the download again. Then the error checking program checks the data a second time at step 617. After the second time, if errors are still present, then the scanning device download procedure ends unsuccessfully at step 611. However, if at this time, there are no errors present, the scanning device download procedure ends as normal in step 615.

Figure 7:
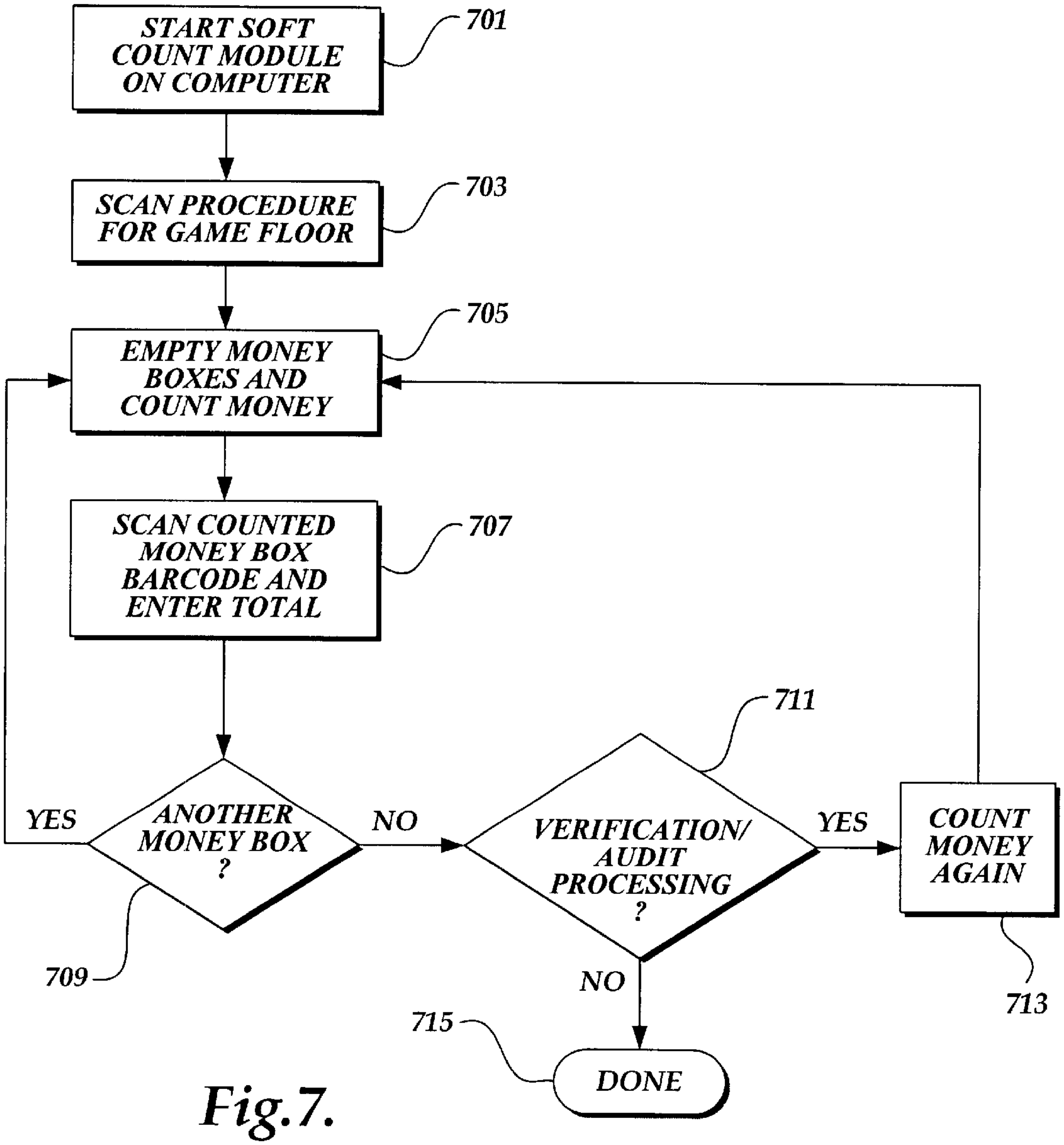
FIG. 7 is a flowchart of the operation of a money count procedure for use within a computer program for record-keeping in a gaming environment.

FIG. 7 depicts a flowchart of the count procedure of the record-keeping program. A count procedure is conducted when full money boxes have been retrieved from a gaming area. Data concerning the amount of money collected in each money box is ascertained and recorded in the database of the record-keeping program computer. The procedure is initiated by starting the count program on a computer in the count room in step 701. In step 703, a particular scan procedure is chosen based on the gaming area that is about to be counted. In one embodiment, the information tag on the money box is scanned by a scanning device and an information tag ticket is generated, typically with a printer. In step 705, the money from a full money box just collected from the gaming area is counted and a total amount is determined. In step 707, the information tag receipt from the now empty money box is scanned by a scanning device and the amount of money counted from the box is manually entered into the database on the server. In one embodiment, a script containing an information tag is created, wherein the information tag contains information identifying the amount of money in the money box and the particular money box identified. Then the amount of money in the money box is determined, by a counting machine or alternatively by a manual count. This information is transmitted to the server computer and associated with the appropriate gaming machine in the database. Alternatively, the manually entered money total is transmitted with the identification of the money box when a script is not used to identify the amount of money counted inside a particular money box. In step 709, a decision is made as to whether or not more money boxes need to be counted. If yes, then the process repeats starting from step 705. If no, then another decision is made, at step 711 as to whether or not to perform a verification or auditing procedure. If yes, then the process repeats starting from step 705. If no, then the count procedure ends at step 715.

While the preferred embodiment of the invention has been illustrated and described, it will be appreciated that various changes can be made therein without departing from the scope of the invention.

The embodiments of the invention in which an exclusive property or privilege is claimed are defined as follows:

1. A method for providing record-keeping in a gaming environment having a plurality of gaming machines that have removable money boxes, comprising:

defining, in a computer database, a list of the plurality of gaming machines and a list of money boxes removably attached to the plurality of gaming machines;

retrieving and storing in computer memory, information from an information tag affixed to each of the plurality of gaming machines, the information uniquely identifying a gaming machine;

retrieving and storing in computer memory, information from an information tag affixed to each money box removably attached to and associated with each of the plurality of gaming machines, the information uniquely identifying a money box; the retrieving of information from the gaming machine tag and the money box tag being conducted separately;

associating, in a database, the retrieved information from each of the plurality of gaming machines with the particular information from the corresponding money box removably attached to each of the plurality of gaming machines;

identifying each gaming machine that is defined in the list of the plurality of gaming machines but does not have information retrieved and stored from a corresponding information tag; and identifying each money box that is defined in the list of the money boxes but does not have information retrieved and stored from a corresponding information tag affixed therein.

2. The method of claim 1 wherein retrieving information is accomplished using a scanning device to scan the information tag.

3. The method of claim 1, wherein storing information in memory is accomplished by transmitting information to a computer database.

4. The method of claim 3, wherein the transmitting of information to the computer database is via a wireless communication connection.

5. The method of claim 3, wherein the transmitting of information to the computer database is via a hard-wired link connected to a computer network capable of communicating with the computer database.

6. The method of claim 1, further comprising:

retrieving and storing information that represents the amount of money in each money box, associating the information that represents the amount of money in each money box with the information retrieved from each of the plurality of gaming machines and corresponding money boxes.

7. The method of claim 6 wherein retrieving information is accomplished using a scanning device to scan an information tag.

8. The method of claim 6, wherein storing information in memory is accomplished by transmitting information to a computer database.

9. The method of claim 8, wherein the transmitting of information to the computer database is via a wireless communication connection.

10. The method of claim 8, wherein the transmitting of information to the computer database is via a hard-wired link connected to a computer network capable of communicating with the computer database.

11. The method of claim 6, further comprising storing in memory a timestamp identifying the time of retrieval of the information from the gaming machines, the money boxes and the amount of money inside each money box.

12. The method of claim 1 further comprising determining an anomaly after all information has been associated in the database, wherein an anomaly is a gaming machine without an associated money box or a money box without an associated gaming machine.

13. The method of claim 1, wherein the information tag is a barcode.

14. A computer-readable medium containing computer-executable instructions for each of the methods in claims 1–13.

15. A system for providing record-keeping in a gaming environment having a plurality of gaming machines containing money boxes, the system comprising:

a scanning device for retrieving information from an information tag affixed to a gaming machine that corresponds uniquely to the gaming machine and from an information tag affixed to a money box associated with the gaming machine that corresponds uniquely to the money box; the retrieving of information from the gaming machine tag and the money box tag being conducted separately;

a computer with a program running thereon, the program being capable of associating, in a database, the information from the information tag affixed to the gaming machine to the information from the information tag affixed to the money box; and a transmitting device used in conjunction with the scanning device to transmit both the information retrieved from the information tag affixed to the gaming machine and the information retrieved from the information tag affixed to the money box to the database at the computer.

16. The system of claim 15, wherein the transmitting device is capable of transmitting a timestamp with the information retrieved.

17. The system of claim 15, further comprising a device for printing a receipt after the information retrieved from the money box has been transmitted to the database in the computer.

18. The system of claim 15, wherein the transmitting device transmits via a wireless communication connection.

19. The system of claim 15, wherein the transmitting device transmits via a hard-wired communication connection through a link with the scanning device.

20. The system of claim 15, wherein the scanning device is an infrared scanning device.

21. The system of claim 15, wherein the scanning device is an RF scanning device.

22. The system of claim 15, wherein the program comprises a sequence of program steps that cause a processor in the computer to determine on or more anomalies in the information received from the scanning device.

23. The system of claim 22, wherein the anomaly is an unidentified or missing money box.

24. The system of claim 22, wherein the anomaly is an unidentified or missing gaming machine.

25. The system of claim 22, wherein the anomaly is a money box identified more than once.

26. The system of claim 22, wherein the anomaly is a gaming machine identified more than once.

* * * * *

UNITED STATES PATENT AND TRADEMARK OFFICE
CERTIFICATE OF CORRECTION

PATENT NO. : 6,633,881 B2
DATED : October 14, 2003
INVENTOR(S) : R. Drobish et al.

It is certified that error appears in the above-identified patent and that said Letters Patent is hereby corrected as shown below:

Title page,
Item [75], Inventors, "Sedro-Woolley," should read -- Sedro Woolley, --

Column 11,
Lines 5 and 43, "claim 1" should read -- claim 1, --
Line 20, "box," should read -- box; and --
Line 25, "claim 6" should read -- claim 6, --

Column 12,
Line 41, "determine on or more" should read -- determine one or more --

Signed and Sealed this

Second Day of March, 2004

JON W. DUDAS
*Acting Director of the United States Patent and Trademark Office*